Figure 1:
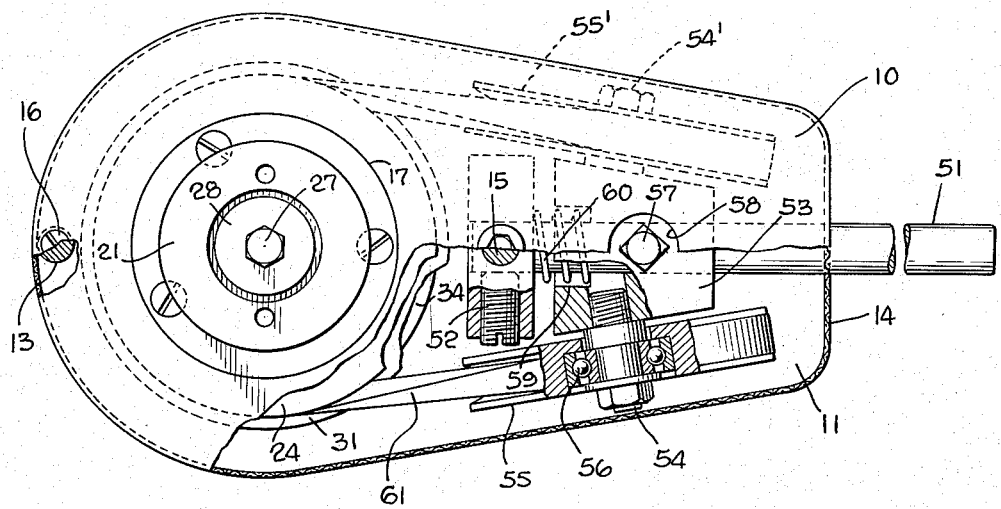

Nov. 24, 1953  M. H. EMRICK  2,660,068
FORWARD AND REVERSE BELT DRIVE FOR TAPPING ATTACHMENTS
Filed Jan. 10, 1952

INVENTOR
MELVIN H. EMRICK
BY
*Howard E. Thompson*
ATTORNEY

Patented Nov. 24, 1953

2,660,068

UNITED STATES PATENT OFFICE 2,660,068

FORWARD AND REVERSE BELT DRIVE FOR TAPPING ATTACHMENTS

Melvin H. Emrick, Jamaica, N. Y.

Application January 10, 1952, Serial No. 265,904

12 Claims. (Cl. 74—220)

1

This invention relates to tapping attachments and, particularly, devices of this type and kind designed to be operated at high speeds. More particularly, the invention deals with an attachment having a continuous belt passing over two sets of pulleys in control of the forward and reverse drives of the attachment and, wherein, one set of pulleys is movable relatively to the other in control of the belt and in compensating for wear.

Still more particularly, the invention deals with an attachment employing an openwork enveloping casing with a fan disposed within the attachment for circulation of air to maintain the operating parts against overheating in the operation of the attachment.

Figure 2:
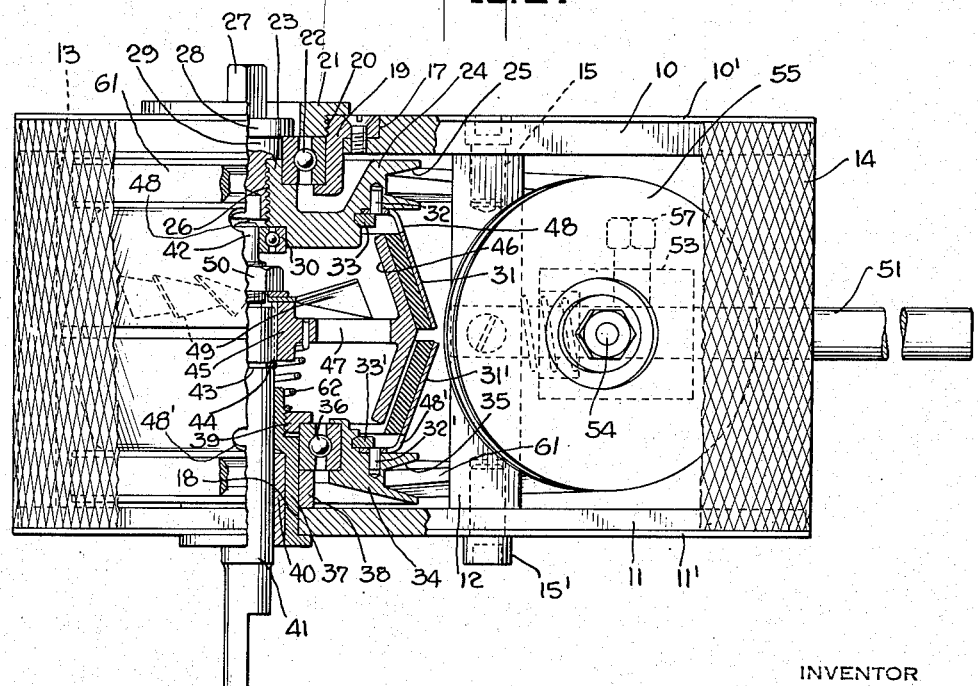

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a plan view of the attachment, with parts of the construction broken away and in section; and Fig. 2 is a side view of the attachment showing parts of the construction broken away and in section.

In practice, I provide an attachment comprising a supporting frame consisting of top and bottom plates 10 and 11 of the general plan contour noted in Fig. 1, these plates being joined and reinforced by a bearing block or column 12 and by a post 13 disposed centrally of one end portion of the plates, as will be noted from a consideration of Fig. 1 of the drawing. The plates 10 and 11 have, at upper and lower edges, respectively, outwardly extending flanges 10' and 11' forming recesses for reception of any type or kind of openwork housing 14, completing enveloping the frame of the attachment. This housing can be secured in position in any desired manner. The bearing block or column 12 is secured to the plates 10 and 11 by screws 15, 15' and screws are also employed to secure the post 13 in position, one of these screws being indicated at 16 in Fig. 1 of the drawing.

The plates 10 and 11 have vertically alined apertures, as for example, the recessed aperture 17 in the plate 10 and the aperture 18 in the plate 11. Secured and countersunk in the aperture 17 is a flanged sleeve or bearing supporting member 19, threaded as seen at 20, to receive a retaining ring 21 for supporting a ball or other bearing 22 in position.

2

Mounted in the bore of the bearing 22 is the hub portion 23 of a forward drive pulley element 24. The pulley portion 25 of the element 24 partially envelops the member 19 or, in other words, is brought into close proximity to the inner surface of the upper plate 10, as clearly seen in Fig. 2 of the drawing. The pulley element 24, or the hub portion 23 thereof, is threaded, as seen at 26, to receive a square or other coupling 27 to place the attachment in operative engagement with a suitable drive, the coupling 27 being flanged, as seen at 28, to overlie part of the bearing 22, as clearly seen in Fig. 2. The coupling 27 also has a ring portion which seats upon the hub 23, as will clearly appear.

Mounted in the lower portion of the pulley element 24 is an anti-friction bearing 30. At 31 is shown a forward drive friction conical clutch keyed to the pulley element 24, as indicated at 32, and retained against displacement from the element by a spring key ring 33.

At 31' is shown a reverse drive conical friction clutch keyed to a reverse drive pulley element 34, as at 32' and retained in position by a ring 33', similar to the ring 33. The element 34 has a pulley portion 35 also disposed in proximity to the inner surface of the bottom plate 11 of the attachment. The element 34 is mounted upon a ball or other anti-friction bearing 36 supported on a sleeve 37 mounted in the aperture 18, a spacing ring 38 being employed to position the bearing 36, as will be apparent. A nut 39 is in threaded engagement with the sleeve to further position the bearing 36 upon the sleeve 37.

Arranged within the sleeve 37 is a long oil light or other bearing 40, in which the tool supporting spindle 41 is mounted. The spindle 41 extends upwardly into the casing of the attachment and has a reduced end 42 which operates in the bearing 30, as clearly noted in Fig. 2 of the drawing.

The spindle 41 has a ring groove 43 for receiving a ring 44 for positioning the hub portion 45 of a double faced conical clutch 46 in position within the clutches 31, 31' to control forward and reverse drives of the spindle 41, as in other devices of this type and kind.

The clutch 46 has an open web structure 47 facilitating the circulation of air therethrough and the conical clutches 31, 31' have circumferentially spaced apertures, one of which is seen at 48, 48' for circulation of air outwardly through the clutches into the openwork casing.

A fan element 49 is mounted on the clutch 46 or the hub portion 45 thereof by a nut 50 in threaded engagement with the upper portion of the spindle 41. It will be understood that the clutch 46 is suitably keyed to the spindle to insure positive drive when the clutch is operated through either of the conical clutches 31, 31'.

Fixed in the bearing block 12 is a shaft 51, the shaft being fixed by a set screw 52, note Fig. 1, and adjustably clamped on the shaft 51 within the contracted portion of the casing of the attachment is a pulley supporting block 53, substantially conical in form and having angularly extending threaded sockets for reception of mounting bolts 54, 54'. These bolts provide supports for idler pulleys 55, 55', the pulleys having ball bearing mountings on the bolts and one of these mountings is shown at 56 in Fig. 1 for mounting the pulley 55 on the bolt 54. The bolt 54 may be termed a stub shaft suitably collared for retaining and mounting of the bearing thereon, in the manner clearly illustrated.

A set screw 57 is accessible through an opening 58 in the top plate 10, note Fig. 1, to control setting of the block 53 on the shaft 51.

The inner end of the block 53 has a recess 59 for reception of a spring 60, which also bears upon the block 20 and this spring serves to apply sufficient tension on the endless belt 61, so as to maintain the same taut in the operation of setting the screw 57. In other words, if, during the operation of the attachment, the belt should become worn or stretched, the screw 57 can simply be loosened and the spring 60 will automatically take up the slack in the belt 61; whereupon, the screw 57 can again be tightened. It will appear from a consideration of Figs. 1 and 2 of the drawing that the shaft 51 extends out through the casing of the device and this extending end of the shaft can be utilized in support of the attachment in connection with the machine to take up tortional stresses or strains to which the attachment may be subjected.

It will be understood that the pulleys 24—34, 55, 55' are of the V-type and the belt 61 is a V-belt for operation therein. This endless belt will be passed around the two sets or pairs of pulleys in the following manner.

Considering the belt 61, as viewed in Fig. 1, it will appear that the belt leaves the rear side portion of the pulley 24 and, then, passes downwardly around pulley 55', then around the rear portion of pulley 34 and, then, forwardly and upwardly around pulley 55 and then backwardly around pulley 24, which completes the cycle of the belt. In other words, it will be understood that the diameter of the pulleys 55, 55' is such as to be substantially in alinement with the vertical spacing of pulleys 25, 35 and, by mounting the pulleys 55, 55' in the angular manner shown, the belt 61 passes from the pulleys 24—34 onto the pulleys 55, 55' in substantially a straight line.

It will appear from a consideration of Fig. 2 of the drawing that a spring 62 is employed between the sleeve 37 or nut 39 and the hub portion 45 to normally maintain the head 46 in engagement with the conical clutch 31 for the forward drive of the spindle and, in the reverse drive when the tap is removed from a tapped hole, the frictional engagement of the tap will cause the head 46 to be moved downwardly against the action of the spring 62 into engagement with the reversely driven conical clutch 31'.

By employing a belt drive of the type and kind under consideration, a tapping attachment can be operated at extremely high speeds with a minimum of wear, vibration and noise and, by circulating air through the attachment, the operating parts can be kept from overheating and quick forward and reverse drives of the spindle 41 can be accomplished.

It will also be understood that an attachment of the kind under consideration is extremely economical in design as compared with other types of gear driven devices of the kind under consideration.

In the operation of the device, the endless belt assumes a twist in extending from the horizontally disposed V-grooves of the forward and reverse drive pulleys and extending to the vertically disposed pulleys 55, 55' and this twist of the V belt has been indicated in Fig. 1 of the drawing.

It will be apparent that the drive herein provided can be utilized for any type and kind of device, wherein it is desirable to employ a forward and reverse drive to a tool or other shaft.

Having fully described my invention, what I claim as new and desire to secure by Letters Patent is:

1. A tapping attachment of the character described, comprising an openwork casing defined by top and bottom plates, means including a bearing block for joining and spacing said plates, an openwork casing fitting peripheral edges of the plates to house the mechanism within the attachment, a forward drive pulley rotatably mounted in connection with the upper plate, a reverse drive pulley rotatably mounted in connection with the bottom plate, conical clutches coupled with said pulleys, a double-faced clutch head arranged within and operatively engaging the conical clutches of said pulleys, said head including a driven spindle projecting from the bottom plate of said casing, means projecting through the upper plate of the casing for coupling the forward drive pulley with a suitable drive, a dual pulley unit adjustably mounted in one side of the casing and movable toward and from said first named pulleys, and an endless belt passing around the pulleys of said unit and said forward and reverse pulleys in controlling the drive of the reverse drive pulley from said directly operated forward drive pulley.

2. A tapping attachment of the character described, comprising an openwork casing defined by top and bottom plates, means including a bearing block for joining and spacing said plates, an openwork casing fitting peripheral edges of the plates to house the mechanism within the attachment, a forward drive pulley rotatably mounted in connection with the upper plate, a reverse drive pulley rotatably mounted in connection with the bottom plate, conical clutches coupled with said pulleys, a double-faced clutch head arranged within and operatively engaging the conical clutches of said pulleys, said head including a driven spindle projecting from the bottom plate of said casing, means projecting through the upper plate of the casing for coupling the forward drive pulley with a suitable drive, a dual pulley unit adjustably mounted in one side of the casing and movable toward and from said first named pulleys, an endless belt passing around the pulleys of said unit and said forward and reverse pulleys in controlling the drive of the reverse drive pulley from said directly operated forward drive pulley, said bearing block including a shaft projecting from the casing, and said dual pulley unit being adjustable on said last named shaft.

3. A tapping attachment of the character described, comprising an openwork casing defined by top and bottom plates, means including a bearing block for joining and spacing said plates, an openwork casing fitting peripheral edges of the plates to house the mechanism within the attachment, a forward drive pulley rotatably mounted in connection with the upper plate, a reverse drive pulley rotatably mounted in connection with the bottom plate, conical clutches coupled with said pulleys, a double-faced clutch head arranged within and operatively engaging the conical clutches of said pulleys, said head including a driven spindle projecting from the bottom plate of said casing, means projecting through the upper plate of the casing for coupling the forward drive pulley with a suitable drive, a dual pulley unit adjustably mounted in one side of the casing and movable toward and from said first named pulleys, an endless belt passing around the pulleys of said unit and said forward and reverse pulleys in controlling the drive of the reverse drive pulley from said directly operated forward drive pulley, said bearing block including a shaft projecting from the casing said dual pulley unit being adjustable on said last named shaft, and the pulleys of said unit being disposed angularly to each other and in a plane perpendicular to the plane of the first named pulleys.

4. A tapping attachment of the character described, comprising an openwork casing defined by top and bottom plates, means including a bearing block for joining and spacing said plates, an openwork casing fitting peripheral edges of the plates to house the mechanism within the attachment, a forward drive pulley rotatably mounted in connection with the upper plate, a reverse drive pulley rotatably mounted in connection with the bottom plate, conical clutches coupled with said pulleys, a double-faced clutch head arranged within and operatively engaging the conical clutches of said pulleys, said head including a driven spindle projecting from the bottom plate of said casing, means projecting through the upper plate of the casing for coupling the forward drive pulley with a suitable drive, a dual pulley unit adjustably mounted in one side of the casing and movable toward and from said first named pulleys, an endless belt passing around the pulleys of said unit and said forward and reverse pulleys in controlling the drive of the reverse drive pulley from said directly operated forward drive pulley, and a fan mounted on said drive shaft within said clutch head.

5. A tapping attachment of the character described, comprising an openwork casing defined by top and bottom plates, means including a bearing block for joining and spacing said plates, an openwork casing fitting peripheral edges of the plates to house the mechanism within the attachment, a forward drive pulley rotatably mounted in connection with the upper plate, a reverse drive pulley rotatably mounted in connection with the bottom plate, conical clutches coupled with said pulleys, a double-faced clutch head arranged within and operatively engaging the conical clutches of said pulleys, said head including a driven spindle projecting from the bottom plate of said casing, means projecting through the upper plate of the casing for coupling the forward drive pulley with a suitable drive, a dual pulley unit adjustably mounted in one side of the casing and movable toward and from said first named pulleys, an endless belt passing around the pulleys of said unit and said forward and reverse pulleys in controlling the drive of the reverse drive pulley from said directly operated forward drive pulley, a fan mounted on said drive shaft within said clutch head, and said conical clutches having vent apertures for circulation of air therethrough.

6. In devices of the character described, employing a drive spindle and a driven shaft, a forward and reverse drive mechanism for actuating the driven shaft in forward and reverse directions from said drive spindle, said mechanism comprising a forward drive pulley directly coupled with the spindle, a double-faced clutch head on the driven shaft, a reverse drive pulley rotatable on said driven shaft, said pulleys having conical clutches coupled therewith, a duplex pulley unit adjustable toward and from said first named pulleys, an endless belt operatively engaging all of the pulleys in control of the drive of the reverse pulley from the forward drive pulley, and a spring for moving the pulley unit relatively to the first named pulleys in taking up belt slack.

7. In devices of the character described, employing a drive spindle and a driven shaft, a forward and reverse drive mechanism for actuating the driven shaft in forward and reverse directions from said drive spindle, said mechanism comprising a forward drive pulley directly coupled with the spindle, a double-faced clutch head on the driven shaft, a reverse drive pulley rotatable on said driven shaft, said pulleys having conical clutches coupled therewith, a duplex pulley unit adjustable toward and from said first named pulleys, an endless belt operatively engaging all of the pulleys in control of the drive of the reverse pulley from the forward drive pulley, a spring for moving the pulley unit relatively to the first named pulleys in taking up belt slack, and said unit comprising a pair of pulleys disposed angularly to each other and perpendicular with respect to the plane of said first named pulleys.

8. A tapping attachment of the character described, comprising a casing defined by upper and lower plates of substantially the same peripheral dimensions, an openwork housing joining said plates, means bracing and spacing the plates, a drive spindle having a ball bearing mounting in the top plate of said casing, a driven shaft having a long bearing support in the bottom plate of the casing and extending into the casing, a double-faced clutch head mounted on the driven shaft within said casing, and means comprising a pair of conical friction clutches having means for driving one clutch in a forward direction and the other clutch in a reverse direction for operating the driven shaft in forward and reverse directions by movement of the head into engagement with said clutches.

9. A tapping attachment of the character described, comprising a casing defined by upper and lower plates of substantially the same peripheral dimensions, an openwork housing joining said plates, means bracing and spacing the plates, a drive spindle having a ball bearing mounting in the top plate of said casing, a driven shaft having a long bearing support in the bottom plate of the casing and extending into the casing, a double-faced clutch head mounted on the driven shaft within said casing, means comprising a pair of conical friction clutches having means for driving one clutch in a forward direction and the other clutch in a reverse direction for operating the driven shaft in forward and reverse directions by movement of the head into engagement with said clutches, the conical clutches having circumferentially spaced vent apertures, and a fan mounted on the driven shaft within the clutch head for circulating air through the head, clutches and the casing.

10. In devices of the class described, a casing having a pair of pulleys arranged in spaced parallel relationship to each other, a pulley unit comprising a pair of pulleys arranged in a plane perpendicular to the plane of the first named pulleys, a single belt operatively engaging all of the pulleys whereby, in the drive of the pulleys, one of the first named pulleys is driven in a forward direction and the other in a reverse direction, a spring for moving the pulley unit relatively to the first named pair of pulleys in taking up belt slack, a driven shaft, and means for operating said shaft in forward and reverse directions from said forward and reverse operating pulleys.

11. In devices of the class described, a casing having a pair of pulleys arranged in spaced parallel relationship to each other, a pulley unit comprising a pair of pulleys arranged in a plane perpendicular to the plane of the first named pulleys, a single belt operatively engaging all of the pulleys whereby, in the drive of the pulleys, one of the first named pulleys is driven in a forward direction and the other in a reverse direction, a spring for moving the pulley unit relatively to the first named pair of pulleys in taking up belt slack, a driven shaft, means for operating said shaft in forward and reverse directions from said forward and reverse operating pulleys, and the drive of the pulleys comprising a spindle directly coupled with one of said first named pulleys.

12. In devices of the class described, a casing having a pair of pulleys arranged in spaced parallel relationship to each other, a pulley unit comprising a pair of pulleys arranged in a plane perpendicular to the plane of the first named pulleys, a single belt operatively engaging all of the pulleys whereby, in the drive of the pulleys, one of the first named pulleys is driven in a forward direction and the other in a reverse direction, a spring for moving the pulley unit relatively to the first named pair of pulleys in taking up belt slack, a driven shaft, means for operating said shaft in forward and reverse directions from said forward and reverse operating pulleys, the drive of the pulleys comprising a spindle directly coupled with one of said first named pulleys, and means adjusting the pulleys relatively to each other to maintain the belt in taut driving relationship with said pulleys.

MELVIN H. EMRICK.

References Cited in the file of this patent
UNITED STATES PATENTS

| Number | Name | Date |
|---|---|---|
| 341,972 | Ward | May 18, 1886 |
| 610,208 | Tuttle | Sept. 6, 1898 |
| 2,121,286 | Cordes | June 21, 1938 |